United States Patent [19]

Curtil

[11] Patent Number: 5,156,118
[45] Date of Patent: Oct. 20, 1992

[54] PROCESS AND DEVICE FOR SELF SUPER-CHARGING A TWO STROKE ENGINE

[76] Inventor: Rémi E. Curtil, 7, rue Fortuny, 75017 Paris, France

[21] Appl. No.: 576,421
[22] PCT Filed: Mar. 24, 1989
[86] PCT No.: PCT/FR89/00138
  § 371 Date: Sep. 24, 1990
  § 102(e) Date: Sep. 24, 1990
[87] PCT Pub. No.: WO89/09329
  PCT Pub. Date: Oct. 5, 1989

[30] Foreign Application Priority Data

Mar. 25, 1988 [FR] France ................. 88 04003

[51] Int. Cl.⁵ ............................................. F24B 13/04
[52] U.S. Cl. .............................. 123/70 V; 123/47 A; 123/65 E
[58] Field of Search ............... 123/47 R, 47 A, 70 R, 123/70 V, 65 S, 73 F, 59 B

[56] References Cited

U.S. PATENT DOCUMENTS

| | | | |
|---|---|---|---|
| 1,546,103 | 7/1925 | Perez | 123/70 V |
| 1,866,774 | 7/1932 | Maher | 123/70 V |
| 1,904,816 | 4/1933 | Beaudry | 123/70 V |
| 2,446,094 | 7/1948 | Mattice | 123/65 E |
| 2,766,650 | 1/1957 | Zimmerman | 123/70 V |
| 4,250,844 | 2/1981 | Tews | 123/47 A |
| 5,060,602 | 10/1991 | Maissant | 123/47 A |

FOREIGN PATENT DOCUMENTS

| | | |
|---|---|---|
| 2244910 | 4/1975 | France . |
| 2319768 | 2/1977 | France . |
| 0593420 | 11/1977 | France . |

Primary Examiner—E. Rollins Cross
Assistant Examiner—M. Macy
Attorney, Agent, or Firm—Cushman, Darby & Cushman

[57] ABSTRACT

Process and device for supplying air to the cylinder of a two-stroke internal combustion engine, with at least one set of two cylinders arranged at 180 degrees, supercharged by a post-filling effect. Said device is characterized in that it comprises a volumetric pimp defined by the natural movement of a piston between its top dead center and its bottom dead center and inversely, connected to intake air transit means (8A, 8B) for the air supply thereto. Advantageously the volumetric pump is formed by the pump casing of the cylinder which is in the scavenging phase. In a variant, this device comprises at least one transfer passage (30) intermittently connecting the transit means (8A, 8B) with the upstream pump casing (6B, or 6A) associated therewith. The device of the invention provides, at all times, the required aie supply and hence correct operation of the engine even at low loads or during start-up, and in an easy manner.

16 Claims, 4 Drawing Sheets

PROCESS AND DEVICE FOR SELF SUPER-CHARGING A TWO STROKE ENGINE

The present invention relates essentially to a process and a device for supplying air to a cylinder of a self-supercharged two-stroke engine at to at least one group of two cylinders set at 180° by an air transit chamber supplied under pressure and communicating intermittently with an self-supercharging duct, as well as an engine equipped with such a device or putting such a process into operation.

More particularly the invention relates to a process and a device for supplying air to a cylinder of a two-stroke internal combustion engine, to at least one group of two cylinders set at 180°, with self-supercharging of under the effect of post-charging where the energy of the exhaust gases from one cylinder in this group serves for the self-supercharging of the other cylinder of this group via an self-supercharging duct connecting the inlet ports of the two cylinders of the same group, the inlet ports being uncovered by the piston longer than the exhaust ports.

In the prior art a large number of proposals are already known for utilising the direct action of the gases leaving a cylinder on a reserve of air in order to compress it and introduce it into a cylinder at an appropriate moment in the cycle in order to supercharge it.

Figure 1:
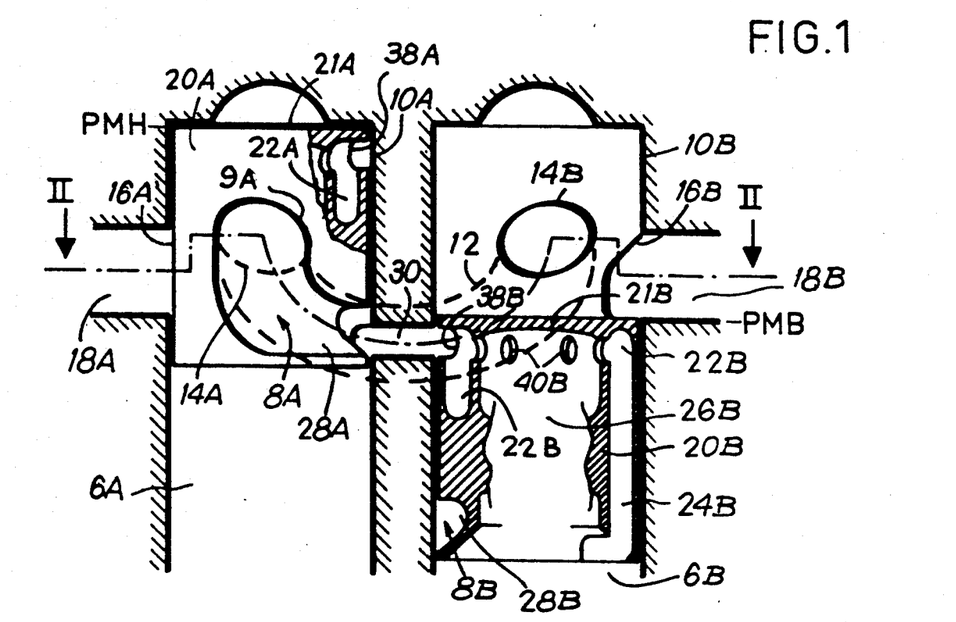
FIG. 1 is a view in longitudinal axial section of a two-stroke internal combustion engine, with at least one group of two cylinders set at 180°, for self-supercharging by the effect of post-charging, equipped with a first, more greatly preferred embodiment of a supply device according to the present invention having at least one transfer channel reducing the centre to centre distance of the two cylinders, the push rod or the driving rod of the piston having been removed in order to facilitate understanding.
Figure 4:
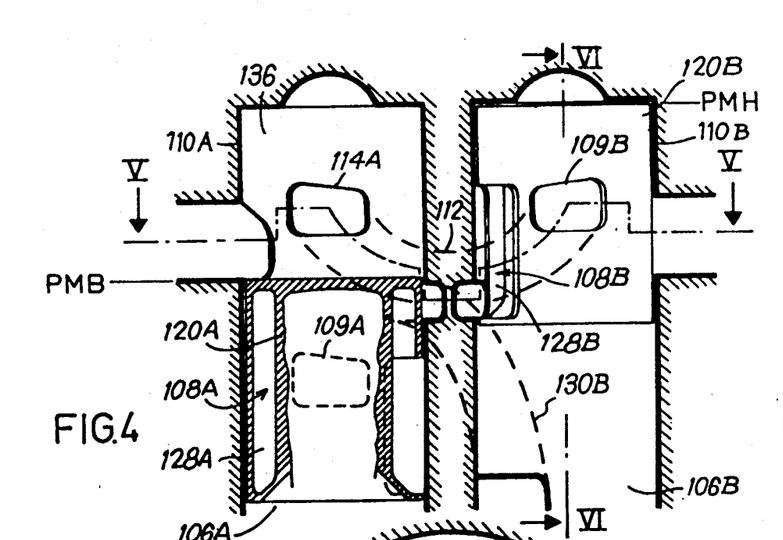
FIG. 4 shows a second embodiment of an air supply device according to the invention, with crossed transfer channels and with transit means formed by an internal cavity in the piston according to a sectional view similar to that of FIG. 1.

Solutions of this type have already been described in CH-A-593 420 according to which the supply duct 9 constitutes the only route for admitting air into the cylinder via an opening 2, 12 in the piston skirt of the other cylinder in communication with the supply duct 9 when this other piston is in the proximity of the dead top centre (see FIG. 1 and FIG. 4).

The solutions described in CH-A-593 420 are particularly interesting in order to obtain a post-charging effect, particularly for two-stroke engines.

In fact, for a given external compression of the air charge the highest possible filling is obtained due to an increase in the air purity because the mass of residual gases not expelled at the end of the scavenging phase is no longer subjected to later modification during the post-charging phase. This is equivalent to an improvement in the scavenging efficiency and to a better utilisation of the scavenging air.

However, the solutions advocated by CH-A-593 420 lead to a favourable auto-scavenging but show some deficiencies in the supply of air in certain operating conditions of the engine, notably on starting or in the event of a high counter-pressure at the exhaust. In addition, these solutions require a special construction of the bi-cylinder combination which is relatively complex, increasing the total centre to centre distance of the cylinders set at 180° of the same group. It is also possible to envisage an improvement in the air supply by the use of a scavenging pump which is auxiliary to the engine, but this greatly complicates the construction.

The object of the present invention, therefore, is to remedy these major drawbacks which have greatly limited the industrial exploitation of the device and of the process advocated in that document.

To this effect the principal object of the present invention is to solve the new technical problem consisting of providing a process and a device for supplying air to each cylinder of a two-stroke internal combustion engine, to at least one group of two cylinders set at 180°, for self-supercharging under the effect of post-charging, which guarantee the supply of air no matter what the operating conditions of the engine may be, notably on starting.

A further principal object of the present invention is to solve the new technical problem consisting of providing a process and a device for supplying air as defined above which make it possible to utilise the natural movement of each piston to transfer the air positively through the self-supercharging duct in spite of the fact that the piston is located at about the dead top centre, that is to say in the inverse position to that which makes it possible to create a pumping effect of the air supply, at the moment when the air supply enters upstream of the self-supercharging duct.

A further principal object of the present invention is to solve the new technical problem set out above whilst maintaining a minimum centre to centre distance of the two cylinders set at 180° of each group.

These new technical problems, as well as others which will be apparent to the expert in the air from the foregoing and the following description are solved for the first time by the present invention in a satisfactory manner which can be used on an industrial scale.

Thus, according to a first aspect, the present invention provides a process for supplying air to a cylinder of a two-stroke internal combustion engine, to at least one group of two cylinders set at 180°, for self-supercharging by the effect of post-charging, where the energy of the exhaust gases from cylinder of this group serves for supercharging the other cylinder of this same group, the inlet ports being uncovered by the piston longer than the exhaust ports, the auto-turbocharging duct constituting the sole route for air intake into the cylinder which is in the scavenging phase, one intake air transit zone being arranged in the interior, or below, the piston of the associated cylinder, supplied upstream by a source of intake air at least at the moment when this piston of the associated cylinder is located at about the dead top centre, whilst this transit zone communicates downstream with the auto-turbocharging duct, characterised in that the natural movement of a piston between its dead top centre and its dead bottom centre and inversely is used in order to create a volumetric pump which supplies the transit zone.

According to one particular embodiment of the process according to the invention, a staged piston is used in such a way that the aforementioned transit zone and the volumetric pump are merged and are located in the same cylinder associated with the cylinder in the scavenging phase.

According to another particular embodiment of the process according to the invention, the piston of the cylinder in the scavenging phase is used in order to produce the aforementioned volumetric pump which supplies the transit zone.

According to yet another particular embodiment of the process according to the invention, of the type which includes cooling of at least the intake routes, this is characterised in that the cooling of at least the intake routes is interrupted at low charges.

According to a second aspect, the present invention also provides a device for supplying air to a cylinder of a two-stroke internal combustion engine, to at least one group of two cylinders set at 180°, for self-supercharging by the effect of post-charging, comprising at least one self-supercharging duct connecting the inlet ports of the two cylinders of the same group, the inlet ports being arranged in the cylinder in such a way that they are uncovered for a longer time by the piston than the exhaust ports, the self-supercharging duct constituting the sole route for air intake into the cylinder which is in the scavenging phase, intake air transit means being arranged in the interior of, or below, the piston of the associated cylinder, supplied upstream by an intake air source at least at the moment when this piston of the associated cylinder is located about the dead top centre, whilst the transit means communicate downstream with the self-supercharging duct, characterised in that it comprises a volumetric pump defined by the natural movement of a piston between its dead top centre and its dead bottom centre and inversely, connected to the intake air transit means in order to supply them with air.

According to one particular embodiment, this device is characterised in that it comprises a staged piston in such a way that the transit means and the aforementioned volumetric pump are merged and are integrated with the piston of the cylinder associated with the cylinder in the scavenging phase. This staged piston draws in the intake air from the exterior when the piston descends towards the dead bottom centre and forces the air back in the self-supercharging duct when the piston is located in the proximity of its dead top centre.

According to another particular embodiment, this device is characterised in that the aforementioned volumetric pump is formed by the pump casing of the cylinder which is in the scavenging phase.

According to an advantageous variant, this device is characterised in that the aforementioned transit means of the piston of the associated cylinder communicate intermittently upstream with the pump casing of the cylinder in the scavenging phase by at least one transfer channel situated below the dead bottom centre.

According to a particular variant, each aforementioned transfer channel serves to supply air successively to each of the two associated cylinders.

According to a particularly advantageous embodiment of the device according to the invention, the aforementioned transit means comprise a transit chamber defined either by an internal cavity in the piston or by at least one recess made in the mass of the piston between the piston and the cylinder, connected intermittently upstream to the pump casing and downstream to the self-supercharging duct.

According to another particular variant, each cylinder comprises at least one group of two self-supercharging ducts and the aforementioned transit means supply air symmetrically to each group of self-supercharging ducts.

According to another particularly advantageous embodiment of the device according to the invention, this is characterised in that it comprises an intake air supply cavity produced internally in the piston communicating upstream with the space below the piston defined by the pump casing and opening downstream onto the piston skirt via a port provided in the piston skirt, this port being made to communicate intermittently, through the aforementioned transfer channel, with the air transit means of the other associated piston by the natural movement of each piston in its cylinder. Preferably this supply cavity is made annular below the head of the piston.

According to a particular variant of this device, the aforementioned piston also comprises a vertical air inlet duct from the space below the piston, provided internally in the piston and connected the space below the piston with the aforementioned cavity. According to a variant, the space defined around the housing of the push rod or of the piston rod which advantageously extends to below the head of the piston communicates downstream via ports with the aforementioned annular cavity which itself extends below the piston head.

According to yet another particularly advantageous characteristic of the device according to the invention, the assembly of each group of two cylinders-pistons set at 180° is arranged symmetrically with respect to the longitudinal plane of symmetry passing through the axes of the two cylinders.

According to another embodiment of the device according to the invention, this comprises two crossed transfer channels each of which permanently connects, upstream, respectively the space below the piston with, downstream, intermittently, the transit means of the piston of the associated cylinder.

According to another variant, each piston is essentially made perfectly cylindrical.

According to yet another particular embodiment of the device according to the invention, this is characterised in that the ratio of the large diameter of each stage piston to its small diameter is a value greater than $\sqrt{2}$.

According to yet another advantageous embodiment of the device according to the invention, in which the engine is equipped with an external turbocompressor, this is characterised in that the ratio of the large diameter of each stepped piston to its small diameter is reduced to the minimum value necessary in order to ensure correct functioning on starting and at low charges.

It will be understood that in this way, with the device according to the invention the volumetric pump is formed directly by the variable volume engendered by the movement of the piston generally formed by the crankcase pump itself or in the case of a cross head design by the space defined by the bottom of the piston and the tightness of the piston rod.

The device according to the invention guarantees the supply of air no matter what the operating conditions of the engine may be, notably on starting.

Moreover, this is ensured in an extremely simple manner, with a low manufacturing cost, by using the natural movements of each piston in such a way that they constitute a volumetric pump.

Other objects, characteristics and advantages of the invention will become clearer in the light of the explanatory description which follows and is made with reference to the accompanying drawings, showing several currently preferred embodiments of the invention which are given simply by way of illustration and which cannot in any way limit the scope of the invention. In the drawings:

DETAILED DESCRIPTION OF THE INVENTION

Figure 2:
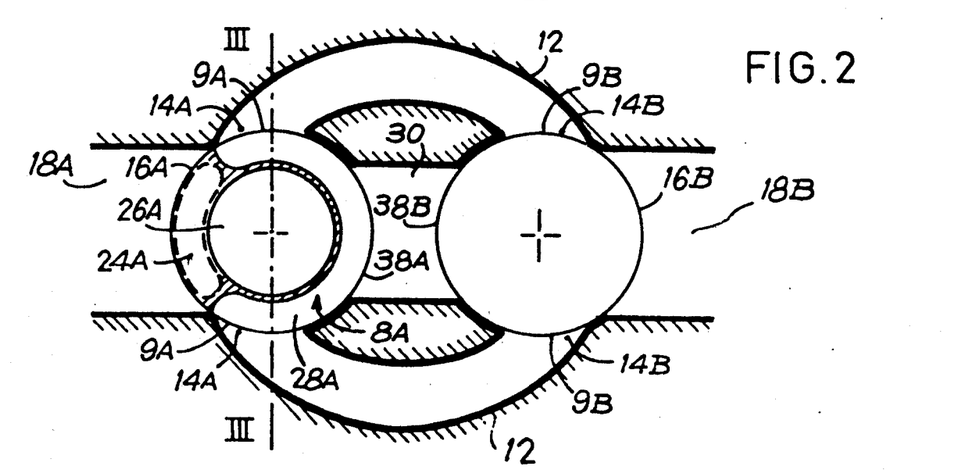
FIG. 2 is a view in transverse axial section of the engine according to FIG. 1, along the line II—II in FIG. 1.
Figure 3:
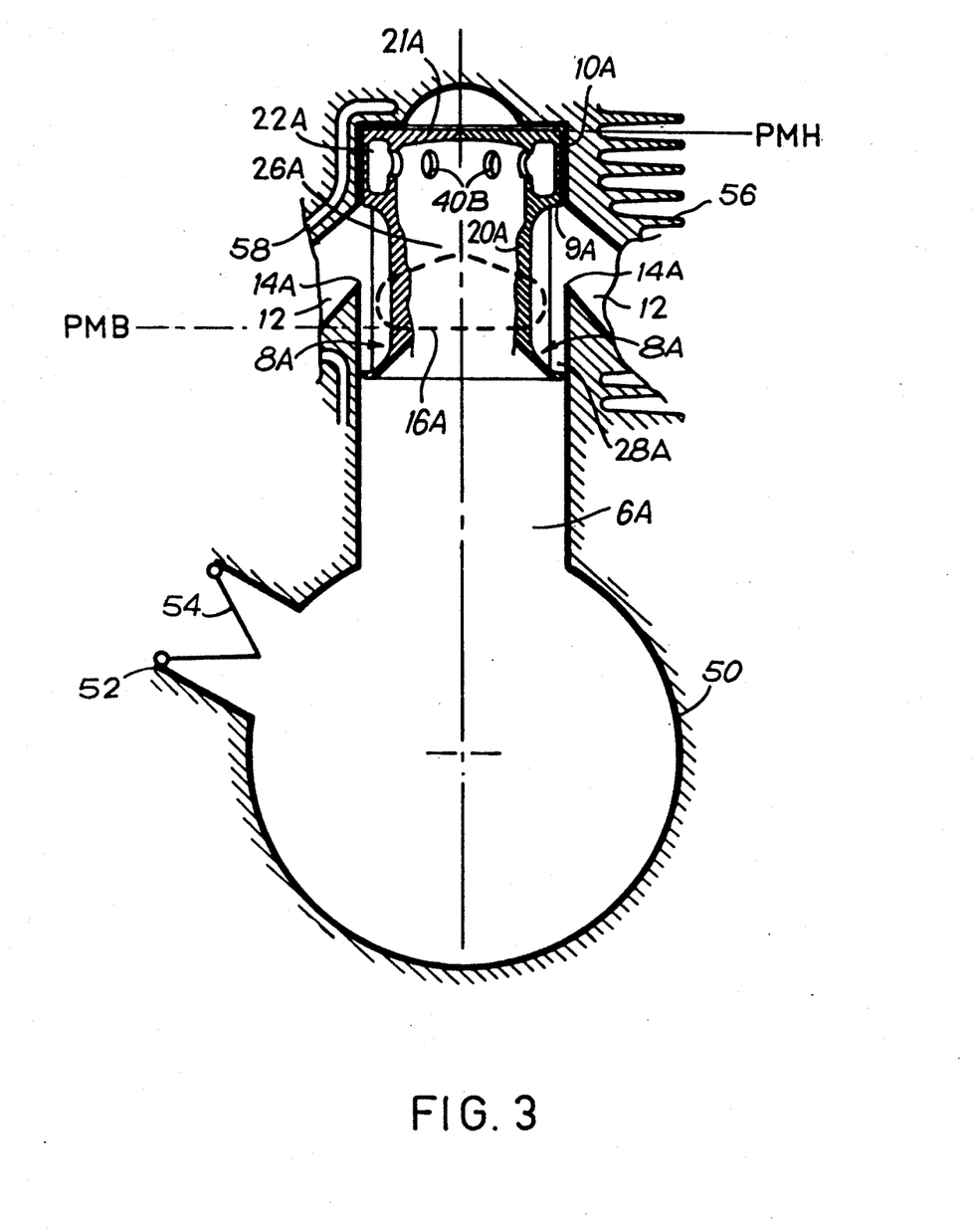
FIG. 3 is a view in axial section along the line III—III in FIG. 2, also showing the crankcase pump.

With reference to FIGS. 1 to 3, these show a two-stroke internal combustion engine with at least one group of two cylinders 10A, 10B set at 180°, with self-supercharging by the effect of post-charging. In order to achieve this, this engine has an air supply device comprising at least one self-supercharging duct 12, connecting the inlet ports 14A, 14B of the two cylinders 10A, 10B of the same group. The inlet ports 14A, 14B are arranged in the cylinder in such a way that they are uncovered for a longer time by the piston than the exhaust ports 16A, 16B of the exhaust duct 18A, 18B. This self-supercharging duct 12 constitutes the sole air intake route in the cylinder 10A or 10B which is in the scavenging phase.

Moreover, intake air transit means 8A, 8B are provided in the interior of, or below, the piston 20A, 20B of the associated cylinder which is in the scavenging phase, supplied upstream by an intake air source at least at the moment when this piston of the associated cylinder is located at about the dead top centre (see the left-hand part of FIG. 1), whilst the transit means are in communication (by means such as 9A) downstream with the self-supercharging duct 12.

According to the invention, this device is characterised in that it contains a volumetric pump defined by the natural movement of a piston between its dead top centre and its dead bottom centre and inversely, connected to the intake air transit means 8A, 8B in order to supply them with air.

According to a variant such as that shown in FIGS. 1 to 3, the aforementioned volumetric pump is formed by the pump casing of the cylinder which is in the scavenging phase.

According to a particularly advantageous embodiment, such as that shown in FIGS. 1 and 2, the transit means 8A, 8B comprise transit chamber 28A, 28B defined here by a recess 28A, 28B in the mass of the piston 20A, 20B, between the piston 20A, 20B and the cylinder 10A, 10B, connected intermittently upstream to the pump casing or piston space, here 6B, 6A, and downstream to the self-supercharging duct 12.

According to an advantageous variant, the transit means 8A, 8B of the piston 20A, 20B of the associated cylinder intermittently communicate upstream with the pump casing of the cylinder in the scavenging phase (such as 10B) by at least one transfer channel 30 situated below the dead bottom centre.

It is clear that, as shown in the right-hand part of FIG. 1, this transfer channel 30 is never made to communicate with the working chamber of the cylinder 10B, 10A.

It may also be observed that the supply of air to the transit means 8A, 8B and the self-supercharging ducts 12 is achieved when the recess 28A, (28B) is simultaneously in communication with the air arriving upstream through the transfer channel 30 opening through its ports 38A level with the lower part of the recess 28A (28B) and while the downstream part 9A (9B) of the upper end of the recess 28A (28B) is in coincidence with the inlet ports 14A, 14B of the self-supercharging duct 12.

According to the embodiment shown in FIGS. 1 and 2, each transfer channel 30 serves to supply air successively to each of the two associated cylinders. This means that the air coming from each pump casing passes successively in the direction of the transit means of the associated cylinder through this transfer channel which thus has the flux of air passing through it in two directions.

According to a particularly advantageous embodiment, such as is shown in FIGS. 1 and 2, each cylinder 10A, 10B comprises at least one group of two self-supercharging ducts 12 and the transit means 8A, 8B symmetrically supply air to each group of self-supercharging ducts 12, which ensures an ideal supply to the self-supercharging ducts 12.

According to an advantageous variant of the invention, the device according to the invention is characterised in that the piston 20A, 20B is made so that it communicates upstream with the space below the piston 6A, 6B forming the pump casing, in a permanent manner, whilst downstream it opens intermittently onto the skirt of the piston 20A, 20B via a port, such as 38A, 38B, in the piston skirt, this port, such as 38B, coming into coincidence with the transfer channel 30 during the scavenging phase of the cylinder such as 10B, that is to say when the piston 20B is located at about its dead bottom centre.

According to a particularly advantageous variant, the permanent communication between the port, such as 38B, and the space below the piston, such as 6B, is produced by way of example by a cavity, such as 22B, internally in the piston, such as 20B. This cavity, such as 22B, is preferably made annular under the head, such as 21B, of the piston, such as 20B.

According to a particular variant of this device, each piston 20A, 20B, also has a vertical duct, such as 24B, for bringing air from the space below the piston 6A, 6B, made internally in the piston, such as 20B, connecting the space below the piston 6A, 6B to the cavity, such as 22B. According to a variant, the space, such as 26B, defined about the housing of the push rod or the piston rod, which extends advantageously as far as the head, such as 21B, of the piston 20B, communicates downstream via ports, such as 40B, with the annular cavity, such as 22B, which itself extends below the head, such as 21B, of the piston 20B.

Furthermore, this device according to the invention is characterised in that the assembly of each group of two cylinders 10A, 10B—pistons 20A, 20B, set at 180°, is arranged symmetrically with respect to the longitudinal plane of symmetry passing through the axes of the two cylinders.

It will also be observed that with the device according to the invention, using the natural movement of the piston in the cylinder, a volumetric pump is thus obtained which is formed directly by the below-piston space 6A, 6B, called the pump casing space, situated below each of the pistons.

FIG. 3 shows a classical example of a crankcase pump 50 provided with a duct for supplying air from the exterior through the intermediary of a non-return valve 54. One variant would be for the duct 52 to open laterally into the cylinder A or B, through the intermediary of an uncovered port when the piston is near its dead top centre. In FIG. 3, cooling means in the form of fins 56 are also shown in the right-hand part, and another variant of the cooling means in the form of a water chamber 58 are shown in the left-hand part.

In this way all the determining technical advantages referred to above are obtained. It will also be observed that this device makes it possible to carry out the process described above and that the functioning is clear to an expert in the art from the foregoing description.

Figure 5:
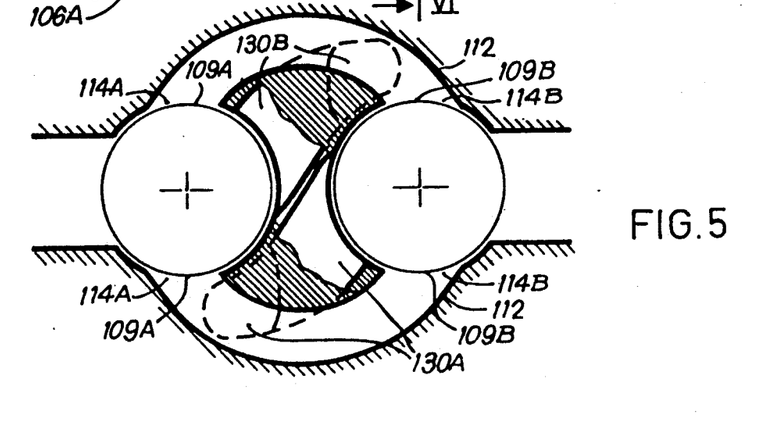
FIG. 5 shows a view in transverse axial section along the line V—V of the device according to FIG. 4 and makes the crossed transfer channels particularly clear.
Figure 6:
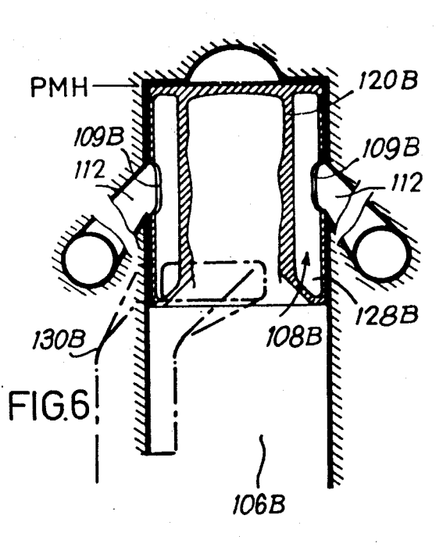
FIG. 6 shows a view in axial section along the line VI—VI in FIG. 4 making it possible to see the air supply through the transfer channel, in communication with the intake duct of a cylinder through the intermediary of the transit means formed by an internal cavity in the piston and by associated ports when the piston is located at about its dead top centre.

With reference to FIGS. 4 to 6, a second embodiment of the device according to the invention is shown, for which the same reference numerals have been used as in FIGS. 1 to 3, but increased by 100, for the parts fulfilling an identical function.

It will be observed that this device is characterised here in that it no longer has one transfer channel 30 serving successively for each of the cylinders as in the embodiment of FIGS. 1 and 2, but two distinct crossed transfer channels 130B, 130A each taking its turn in making respectively the transit chambers 128A and 128B, forming the intake air transit means 108A, 108B, of the pistons 120A, 120B with the below-piston spaces 106A, 106B, formed by the respective crankcase pumps when they are located respectively near their dead top centre and their dead bottom centre. It will be noted that, by contrast with the embodiment of FIGS. 1 to 3, these crossed transfer channels 130B, 130A always have passing through them intake air coming from one or other of the crankcase pump. Thus, when the piston 120B for example is at the dead top centre, as shown in FIGS. 4 to 6, the below-piston space 106A is in communication with the transit chamber 128B through the transfer channel 130A, whilst the transit chamber 128B communicates at that moment via the port 109B in the skirt of the piston 120B with the self-supercharging duct 112 which opens onto the working chamber 136 via its inlet port 114A. It will be understood that, with the device according to the invention, the transit chambers can be in communication via the transfer channels 130A or 130B for convenient durations and periods of the cycle. In any case, the duration of communication must be sufficiently long to make it possible to ensure scavenging of the self-supercharging duct 112, then of the working chamber such as 136 in the scavenging phase.

Figure 7A:
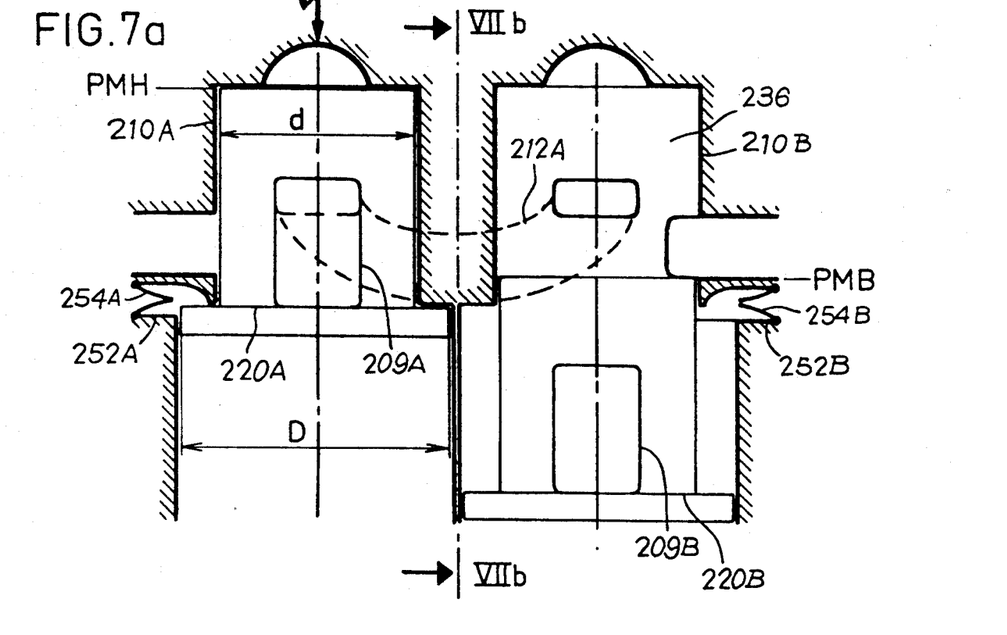
FIGS. 7a, 7b show a third embodiment of a device according to the invention with a stepped piston directly supplying the self-supercharging ducts, the transit means and the volumetric pump being merged. The left-hand half-section shows the piston at the dead top centre and the right-hand half-section shows the piston at the dead bottom centre.
Figure 7B:
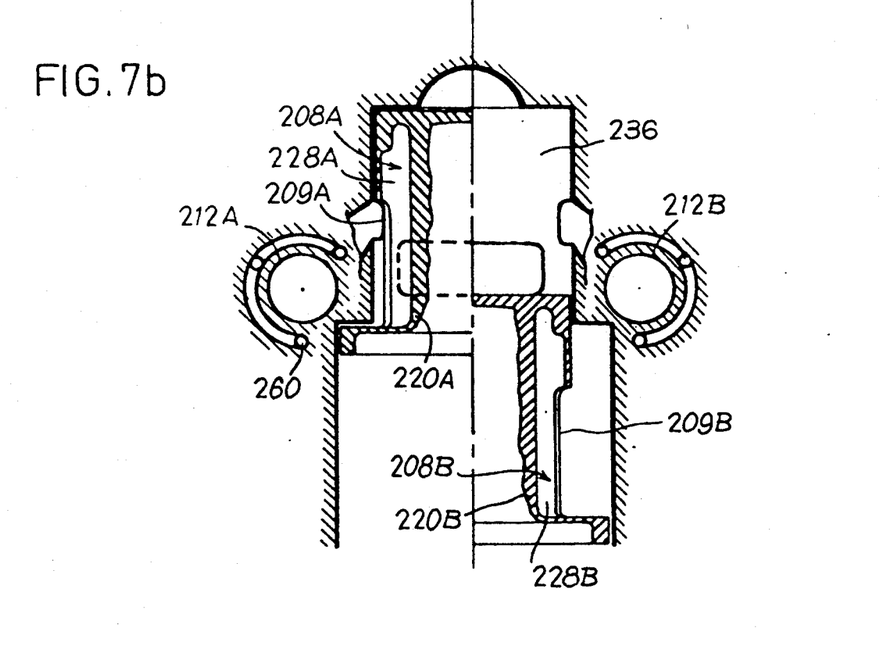

With reference to FIGS. 7a, 7b, a third embodiment of a device according to the invention is shown, for which the same reference numberals have again been used for identical parts, but again increased by 100. According to this embodiment, the piston 220A, 220B of the cylinder 210A, 210B is formed by a stepped piston in such a way as to define the transit chamber 226A, 226B forming the intake air transit means 208A, 208B via a vertical annular zone in permanent communication with the pump space 206A, 206B engendered by the natural movement of the piston 220A, 220B and itself forming the volumetric pump. In a similar manner to that of FIG. 3, a conduit 252A, 252B is provided for supplying air from the exterior through the intermediary of a non-return valve such as 254A. It will thus be understood that the stepped piston 220A, 220B draws the intake air from the exterior when this piston is descending towards the dead bottom centre as shown in the right-hand part of FIGS. 7a and 7b, and forces the air back into the self-supercharging duct 212A, 212B through the port 209A, 209B in the skirt of the piston such as 220A when the piston is located near its dead top centre, as shown in the left-hand part of FIGS. 7a, 7b.

It will be understood that this embodiment according to FIGS. 7a and 7b, using a stepped piston, involves the omission of the transfer channels (30, FIGS. 1 to 3; and 130A, 130B, FIGS. 4 to 6) since the staged piston fulfils the function of the volumetric pump during its movement towards the dead to centre for the same cylinder comprising the functioning transit chamber, such as 220A.

In FIG. 7b cooling means are also shown, for example in the form of ducts such as 260 which are drilled, or even produced by foundry moulding, in the case of water-cooling, a technique which is also known by the name of "bore cooling", distributed around the self-supercharging duct 212A, 212B as shown in partial section along the line VIIb—VIIb in FIG. 7a.

It will be noted that this embodiment according to FIGS. 7a and 7b, using a stepped piston 220A, 220B, also makes it possible, by the appropriate choice of the ratio of its large diameter (D) to its small diameter (d), to increase at will the output of air provided by the volumetric pump. This permits complete scavenging, not only of the self-supercharging duct 212A, 212B, but also of the working chamber such as 236. The aforementioned ratio D/d can in particular be greater than $\sqrt{2}$.

Finally, it will be noted that the structure provided for each of the aforementioned three embodiments of FIGS. 1a to 7b, having pistons with an annular cavity delimited externally by the top of the piston skirt and internally by the walls forming a vault conducting the forces to the relevant axis of the piston, confers upon the assembly a thermal and mechanical axial symmetry. This axial symmetry makes it possible to create naturally conditions which are extremely favourable for the cooling of the piston and consequently for the choice of the pistonsleeve running clearances. If the control of the external cooling of the sleeve also gives its a homogeneous and axially symmetrical cooling, it is then possible to make the piston essentially perfectly cylindrical, which constitutes a considerable manufacturing advantage.

Also, according to an advantageous variant of the process according to the invention, the engine is not cooled at low charges by breaking the cooling circuit of the engine, and particularly the supply routes including the self-supercharging ducts, whilst it is cooled from intermediate charges up to the maximum charge by opening the cooling circuit.

The lack of cooling at low charges makes it possible to raise the temperature of the intake air due to its heating by the walls of the self-supercharging ducts which are themselves heated by the pre-exhaust gases.

The raising of the temperature of the intake air increases its volume and thus produces a decrease in the volume of the residual exhaust gases in the cylinder, which has a favourable influence on the minimum inflammability threshold of the mixture of scavenging air and residual gases principally in the case of engines with controlled ignition.

In each variant, it is possible for the engine with by the effect of after-filling to be supplied as described by external turbocharging, for example by using a turbocompressor forming the low-pressure stage and the self-supercharging by post-charging then constitutes the last high-pressure stage.

Naturally, in this case the low-pressure turbocompressor not only constitutes a means of raising the scavenging pressure but also a means, starting from a certain level of charge, for creating a positive pressure differential between the intake pressure and the exhaust pressure, in a manner which is well known to the expert in the art.

In this case, where the engine is equipped with an external turbocompressor, it is advantageous to reduce the ratio of the large diameter (D) of each staged piston relative to its small diameter (d) to the minimum necessary to guarantee starting and functioning at partial charges before the scavenging is relayed by the turbocompressor. It will be noted that this simultaneously makes it possible to reduce the centre to centre distance between the cylinders.

Naturally, the invention covers all the technical means constituting equivalent techniques to the means described and shown as well as their various combinations.

I claim:

1. A process for supplying air to the cylinders of a two-stroke internal combustion engine of the type having at least two cylinders, for self-supercharging by means of post-charging, each cylinder having an inlet port and an outlet port, a piston mounted for reciprocal movement in each cylinder, said engine having at least one self-supercharging duct connected to said inlet port of each cylinder and at least a transfer duct connecting said cylinders, each piston having air transit means for allowing passage of air to said inlet port when said respective piston is in a selected position relative to said respective inlet port, each said piston having an internal cavity and a pumping chamber in communication with said respective internal cavity, each piston having a closed end and a side wall with a discharge port located in said side wall and spaced from said respective closed end so as to be in alignment with said transfer duct for a selected position of said piston in said respective cylinder, the steps comprising:
    during operation of the engine, passing air from the pumping chamber of one of said pistons through said one piston by means of said discharge port to said transfer duct to said air transit means of the other one of said pistons when said other one of said pistons is at least adjacent the top dead center position thereof and from said air transit means to the inlet port of the cylinder of said other one of said pistons and from said inlet port thereof to said self-supercharging duct to feed air to the cylinder of said one piston.

2. The process as claimed in claim 1 including the step of performing said step of passing air while said one piston is at least adjacent the bottom dead center position to assist scavenging of the cylinder of the said one piston and after discharging said pumping chamber of said one piston during movement of said one piston toward the bottom dead center position of said one piston.

3. The process as claimed in claim 1 including the step of cooling the air during the passage of the air through at least said self-supercharging duct.

4. A self-supercharging device by post charging the cylinders of a two-stroke internal combustion engine having at least two cylinders, each cylinder having an inlet port and an outlet port, a piston mounted for reciprocal movement in each cylinder, said engine having at least one self-supercharging duct connected to said inlet port of each cylinder and a transfer duct connecting said cylinders, each piston having air transit means for allowing passage of air to said inlet port when said respective piston is in a selected position relative to said respective inlet port, said selected position being at least adjacent the top dead center position of said respective cylinder, each said piston having an internal cavity and a pumping chamber in communication with said respective internal cavity, each piston having a closed end and a side wall with a discharge port located in said side wall and spaced from said respective closed end so as to be in alignment with said transfer duct for a selected position of said piston in said respective cylinder, said inlet ports of each cylinder being positioned in each cylinder relative to said respective outlet ports so that said inlet ports are unobstructed by said respective piston for a longer time than said respective outlet ports.

5. The invention as claimed in claim 4 wherein said respective pumping chamber is formed by a pump casing associated with each said cylinder and is discharged when said associated cylinder is being scavenged.

6. The invention as claimed in claim 4 wherein said transfer duct communicates with said cylinders at a position which is below the bottom dead center position of each piston.

7. The invention as claimed in claim 6 wherein said transfer duct is positioned to transfer air alternately from one piston to the other said piston.

8. The invention as claimed in claim 4 wherein two self-supercharging ducts are provided each connected between said cylinders to supply air symmetrically to said cylinders.

9. The invention as claimed in claim 8 wherein each said piston is hollow and said respective side wall is a peripheral skirt defining said internal cavity of each said piston and each said piston has a closed end and an opposite open end in communication with said respective pumping chamber which serves to supply intake air to said respective internal cavity.

10. The invention as claimed in claim 9 wherein said internal cavity is defined by an annular wall below said closed end of said respective piston, said annular wall having an air inlet duct extending along the length of said respective skirt and being in communication with said respective pumping chamber adjacent the open end of said respective piston.

11. The invention as claimed in claim 10 wherein an annular chamber is provided in said respective skirts of said pistons adjacent said closed ends thereof, each said annular chamber being in communication with said respective internal cavity through access ports formed in said respective chamber.

12. The invention as claimed in claim 11 wherein said engine has a block having an plane of symmetry and said two cylinders are disposed symmetrically relative to said plane.

13. A process for supplying air to the cylinders of a two-stroke internal combustion engine of the type having at least two cylinders, for self-supercharging by means of post-charging, each cylinder having an inlet port and an outlet port, a piston mounted for reciprocal movement in each cylinder, said engine having at least one self-supercharging duct connected to said inlet port of each cylinder, each piston having air transit means for allowing passage of air to said inlet port when said respective piston is in a selected position relative to said respective inlet port, each said piston having an internal cavity and a pumping chamber in communication with said respective internal cavity, each piston having a closed end and a side wall with a discharge port located in said side wall and spaced from said respective closed end of a said piston in said respective cylinder, the steps comprising:

during operation of the engine, passing air from the pumping chamber of one of said pistons through said one piston by means of said discharge port to said self-supercharging duct.

14. Device as claimed in claim 13, wherein said pistons of said device each comprises a staged piston wherein said air transit means and said pumping chamber form part of each said piston.

15. Device as claimed in claim 14, wherein each said piston has a first stage having a large diameter D and a second stage having a smaller diameter d and the ratio of the large diameter (D) of each staged piston to its small diameter (d) is a value greater than $\sqrt{2}$.

16. Device as claimed in claim 14, in which the engine is equipped with an external turbocompressor and wherein each said piston has a first stage having a large diameter D and a second stage having a smaller diameter d and the ratio of the large diameter (D) of each piston to its small diameter (d) is reduced to the minimum value necessary in order to ensure correct functioning on starting and at low charges.

* * * * *